United States Patent
Yoon et al.

(10) Patent No.: US 6,621,926 B1
(45) Date of Patent: Sep. 16, 2003

(54) IMAGE RETRIEVAL SYSTEM AND METHOD USING IMAGE HISTOGRAM

(75) Inventors: Ho Sub Yoon, Taejon (KR); Jung Soh, Taejon (KR); Byung Woo Min, Taejon (KR); Young Kyu Yang, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/498,039

(22) Filed: Feb. 4, 2000

(30) Foreign Application Priority Data

Dec. 10, 1999 (KR) .......................... 1999-56707

(51) Int. Cl.$^7$ ................................ G06K 9/00
(52) U.S. Cl. ........................ 382/168; 382/305
(58) Field of Search .......................... 382/305, 168, 382/170; 707/5, 3

(56) References Cited

U.S. PATENT DOCUMENTS 6,163,622 A * 12/2000 Abdel-Mottaleb et al. .. 382/170

FOREIGN PATENT DOCUMENTS

KR     00 53072     7/1999

OTHER PUBLICATIONS

Smith et al. "Single Color Extraction and Image Query". Proc. of International Conference on Image Processing, V. 3, p. 528–531, 1995.*
Zhang et al. "Comparison and Improvement of Color–Based Image Retrieval Techniques". SPIE V. 3312, p. 371–382, 1997.*
Rickman et al. "Content–Based Image Retrieval Using Colour Tuple Histograms". SPIE V. 2670, p. 2–7, 1996.*
John R. Smith et al., "Tools and Techniques for Color Image Retrieval", IS&T/SPIE Proceedings, vol. 2670, Storage & Retrieval for Image and Video Databases IV, pp. 1–12, Feb. 1, 1996.
W. Niblack et al., "The QBIC Project: Querying Images by Content Using Color, Texture, and Shape", IBM Research Division, SPIE, vol. 1908, pp. 173–187, 1993.
James Ze Wang et al., "Wavelet–Based Image Indexing Techniques with Partial Sketch Retrieval Capability", Proceeding on the Fourth Forum on Research and Technology Advances in Digital Libraries, pp. 1–12, May 1997.

* cited by examiner

Primary Examiner—Amelia M. Au
Assistant Examiner—Colin LaRose
(74) Attorney, Agent, or Firm—SEED IP Law Group PLLC

(57) ABSTRACT

An image retrieval system and method using an image histogram for determining central points and dispersion values as well as quantity information of color about respective histogram bins, thereby using these as mapping information for image retrieval. The image retrieval method using an image histogram includes the following steps. A first step of computing an image histogram bin when an image is inputted, and accumulating values of $x, y, x^2, y^2$ to compute central points and dispersion values. A second step of normalizing the respective central points and dispersion values through dividing these by size of whole image, and storing these. A third step of generating a value of model to be retrieved by drawing a feature vector when a query image is inputted, and computing the difference between the generated value of model and central points and dispersion values of an image histogram, count, and number of corresponding bins within the data stored in the second step. A fourth step of specifying a similarity value of an image using the values computed in the third step.

6 Claims, 3 Drawing Sheets

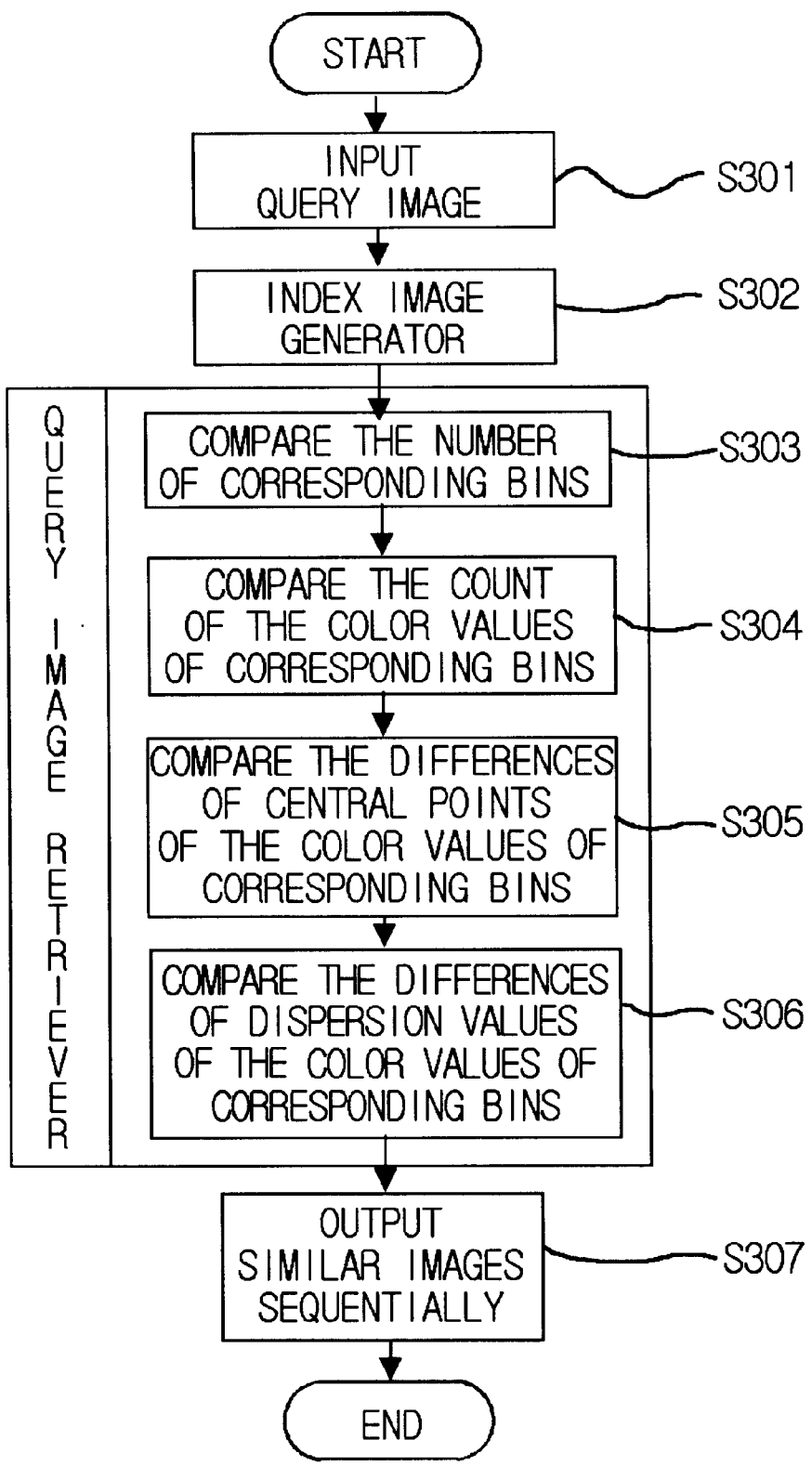

IMAGE RETRIEVAL SYSTEM AND METHOD USING IMAGE HISTOGRAM

TECHNICAL FIELD

The present invention relates to an image retrieval system and method using an image histogram, and, in particular, to an image retrieval system and method of using an image histogram, for determining central points and dispersion values as well as quantity information of color about respective histogram bins, thereby using these as mapping information for image retrieval.

BACKGROUND OF THE INVENTION

An image database can be classified into three groups according to retrieval methods, i.e., text-based, content-based, and semantic-based database, and features used in the retrieval of content-based database are shape, texture, and color. In this case, color has easier to draw characteristics and more applicable to a user's query-by-example than shape and texture.

Conventional color indexing systems usually utilize only a bin which is a specific value of a color histogram. Here, the method of measuring similarity using the difference between two color histograms often results in the difference from the measurement result of the perceptual similarity of an actual person.

This is because color feature values of the histogram, i.e., values of each bin show global feature information, and it is difficult to retrieve an image having correctly requested contents with only the global feature information. That is, a global feature is advantageous for not being affected by rotation of the image or a slight change of position, but has a drawback of not containing any spatial information. Because of such characteristics of a global feature that does not contain spatial information, when retrieving with only color information, a false positive error in the retrieval result can occur.

Since it is very difficult to draw spatial information from an image, conventional methods, which usually divide an image into sub-regions, and obtain global features for the respective sub-regions, have been proposed. Such a method is referred to the color layout. The simplest color layout indexing method divides an image into blocks of the same size and draws color features from the respective blocks, but this method is not suitable for an image having great color variance. Another method performs a segmentation of an image and obtains features of each segment.

It is difficult to implement a full automation system since it is difficult to divide objects of an image. In the real system, a dividing work that users semi-automatically or manually determine objects is used. On the other hand, in recent years, as a new color layout indexing method, methods using the wavelet transform are proposed.

As mentioned above, conventional methods perform retrieval by obtaining global color information and dividing a region in a color histogram and drawing spatial information from the respective sub-regions, and then synthesizing said two results. Such method is not effective because of a problem of synthesizing said two results since there are no relationships between two obtained information, and because it is necessary to draw two different features twice.

SUMMARY OF THE INVENTION

The disclosed embodiments of the present invention provide an image retrieval system and method using an image histogram for finding central points and dispersion values as well as quantity information of color about respective histogram bins, thereby using these as mapping information for image retrieval.

In order to achieve the foregoing, the embodiments of the present invention provide an index information generator of an image retrieval system using an image histogram, wherein said index information generator comprises operation means for computing histogram image bins when an image is inputted, and accumulating x, y, $x^2$, and $y^2$, to compute central points and dispersion values; and the first normalization means for dividing the respective computed central points and dispersion values by the size of the whole image.

In addition, the embodiments of the present invention provide a query image retriever of an image retrieval system using an image histogram, wherein said query image retriever comprises generation means for drawing feature vectors to generate values of a model to be retrieved, operation means for computing a difference between said generated values of the model and the number, count, central point, and dispersion values of corresponding stored histogram bins, and means of specifying similarity for specifying the similarity value of an image by using said computed values.

Furthermore, the disclosed embodiments provide a method for image retrieval using an image histogram that includes the following steps. A first step is when an image is inputted, computing histogram image bins and computing central points and dispersion values by accumulating x, y, $x^2$, and $y^2$. A second step is normalizing through dividing respective central points and dispersion values computed in the first step by the size of whole image, and storing it. A third step is when a query image is inputted, drawing feature vectors and generating values of model to be retrieved, and then computing differences between said generated values of model and the number, count, and central points and dispersion values of the corresponding bins of the image histogram. A fourth step is specifying the similarity value of image using the values computed in the third step.

Also, the disclosed embodiments provide a storage medium containing a program that executes steps, including the following steps. A first step is when an image is inputted, converting the image into color coordinate system, and normalizing it to reduce the feature of the converted values. A second step is computing histogram color bins from the normalized values in the first step, and accumulating x, y, $x^2$, and $y^2$, thereby computing central points and dispersion values. A third step is normalizing the respective computed central points and dispersion values by dividing with the size of whole image, and storing it. A fourth step is when a query image is inputted, generating a value of model to be retrieved by drawing a feature vector, and then computing the difference between the generated value of model and the number, count of color values, and central points and dispersion values of bins corresponding to the stored data in the third step. And a fifth step is specifying the similarity values of an image using the computed values in the fourth step.

BRIEF DESCRIPTION OF THE DRAWINGS

The embodiments of the present invention will be explained with reference to the accompanying drawings, in which:

FIG. 3 is a flow chart showing operation principles of a query image retriever according to an embodiment of the present invention.

DETAILED DESCRIPTION OF THE INVENTION

Figure 1:
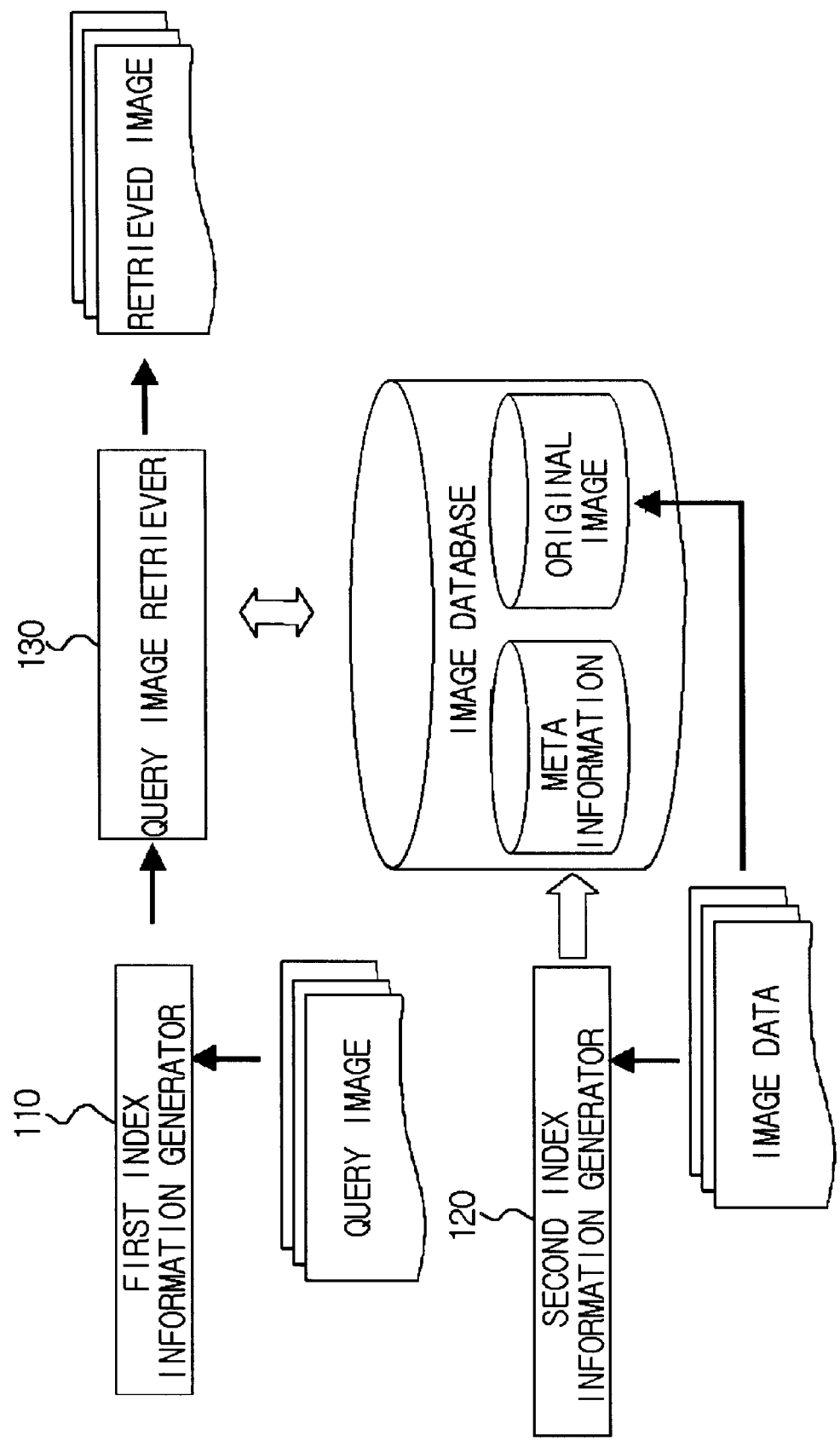
FIG. 1 is a diagram of an image retrieval system using an image histogram, which is applied to the present invention.

FIG. 1 is a diagram of an image retrieval system using an image histogram, which is applied to the present invention. When an image to be retrieved is inputted to the first index information generator 110, the first index information generator 110 draws index information and transfers it to the query image retriever 130.

The query image retriever 130 retrieves a requested image by way of mapping of similarity of the index(meta) information from a previously constructed image database and the index information of the query image and outputs the requested image.

On the other hand, the second index information generator, in which an image data for constructing an image database has been inputted, draws index information, and constructs an image database in the form of meta information and an original image, with the image data.

In the present invention, the index information generator and the query image retriever for retrieving a large amount of image information that exists within the image database shown in FIG. 1, is developed.

Figure 2:
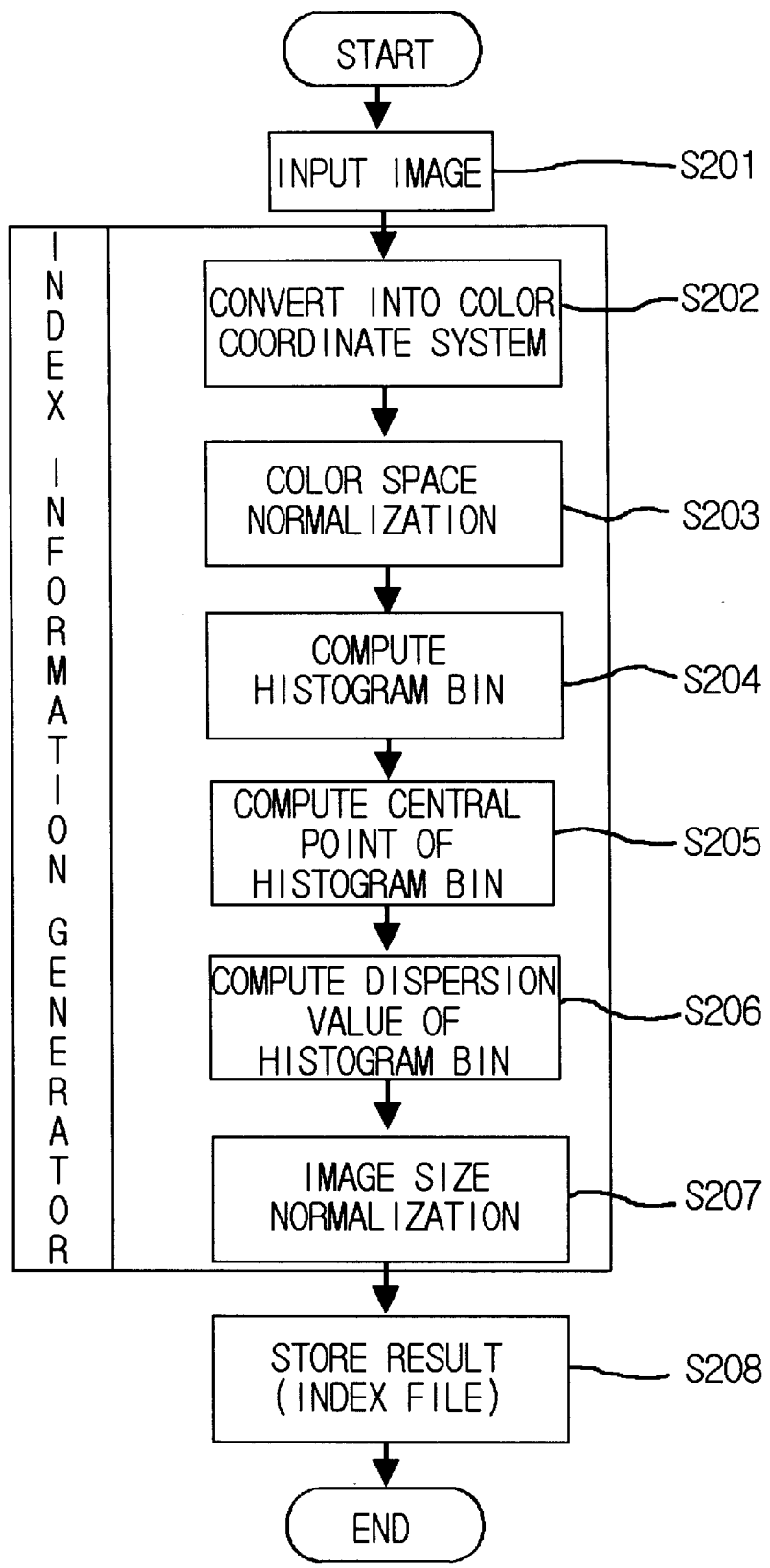
FIG. 2 is a flow chart showing operation principles of an index information generator according to an embodiment of the present invention.

FIG. 2 is a flow chart showing operation principles of the index information generator in FIG. 1, as scanning an entire image, color values to respective coordinates are accumulated in the corresponding bins, and thereby features are measured.

First, when an image is inputted in step S201, in step S202, the image is converted into a color coordinate system of YIO, YUV, HSV, etc. since a histogram having three axes of RGB requires substantial data, and then color space normalization is performed in step S203. Here, a method for normalization is converting an image into a two-dimensional histogram except brightness such as IQ or UV, and the other method is to use a scaling vector. That is, the latter method is only to divide color information obtained from RGB by a scale factor(SCALE_RGB) of 2 to reduce the 256 steps of the color information into the 128 steps.

This process reduces the number of features in the color space, and it results in grouping of very small color information to convert into the representative color. Using this representative color shows advantages of reducing the amount of features to be used in the similarity index and not being affected by noise, however it may lower the whole color resolution, thus make a close handling of a complicated image to be difficult. On the other hand, in the case of a gray histogram, the procedure proceeds to step S204 without processing steps S202 and S203.

Next, the histogram bins are computed in step S204, the central points of the histogram bins are computed in step S205, and the dispersions of the histogram bins are computed in step S206.

When examining the above procedures in detail, the value of the accumulation of the color bins, the accumulation of the gray bins, and the accumulation of x, y, $x^2$, and $y^2$ should be determined in order to determine the central points of the histogram bins. In this case, I, Q histograms are not generated as much as a whole color resolution, but these are generated only when the color has occurred more than once, so the unnecessary memory usage can be reduced, and the processing speed in the mapping of the similarity can be increased.

When said accumulation values are determined, the central points of the histogram bins are determined by the Equation 1, and the dispersions are determined by the Equation 2 below.

$$(m_x, m_y), m_x = \frac{1}{n}\sum_{i=1}^{n} x_i$$

$$m_y = \frac{1}{n}\sum_{i=1}^{n} y_i$$

Equation 1

$$(\delta_x^2, \delta_y^2), \delta_x^2 = \frac{1}{n}\sum_{i=1}^{n} x_i^2 - m_x^2$$

$$\delta_y^2 = \frac{1}{n}\sum_{i=1}^{n} y_i^2 - m_y^2$$

Equation 2

Then, in step S207, the image size normalization is performed through dividing the accumulation values, the central points, and dispersion values by entire image size.

The values determined by the above procedures are stored as meta information in the image database shown in FIG. 1.

FIG. 3 is a flow chart describing the operation principles of the query image retriever in FIG. 1. The detailed description is as follows;

At first, when a query image is inputted in step S301, in step S302, feature vectors of a color histogram(central point, dispersion value, etc.) are drawn to generate values of models to be retrieved, and then the similarity measurement is performed by comparing the feature values stored in the meta database in FIG. 2 and the feature values of models by steps S303 to S306, similar images are sequentially outputted, and the processing is ended.

Here, the detailed description of processing the measurement of similarity is as follows;

The value of the similarity measurement is computed by Equation 3 with 6 feature values and 6 weighted values like below.

$$S = W_1 S_{clolr} + W_2 S_{xm} + W_3 S_{ym} + W_4 S_{xd} + W_5 S_{yd} + W_6 S_{count} + W_7 S_{gray}$$

Equation 3

Here, $S_{color}$, $S_{sm}$, $S_{ym}$, $S_{xd}$, $S_{yd}$, $S_{count}$, and $S_{gray}$ are feature vectors of a color histogram determined by Equation 4 below, and $W_1$, $W_2$, $W_3$, $W_4$, $W_5$, $W_6$, and $W_7$ are predetermined weighted values.

Also, the $S_{color}$ is a feature vector to a color histogram bin, $S_{xm}$ is a feature vector to a mean value on x-axis, $S_{ym}$ is a feature vector to a mean value on y-axis, $S_{xd}$ is a feature vector to a dispersion value on x-axis, $S_{yd}$ is a feature vector to a dispersion value on y-axis, $S_{count}$ is a feature vector of count, and $S_{gray}$ is a feature value of a gray value.

Equation 4

$$S_{color} = \sum_{k=1}^{input\_bin} \sum_{l=1}^{model\_bin} f_{color}(k, l)$$

$$f_{color}(k, l) = \begin{cases} \text{if } (H^{Input}i_k = H^{Model}i_l \text{ and } H^{Input}q_k = H^{Model}q_l): abs(H^{Input}(i, q)_k \cdot count - H^{Model}(i, q)_l \cdot count) \\ \text{otherwise: } 0 \end{cases}$$

$$S_{xm} = \sum_{k=1}^{input\_bin} \sum_{l=1}^{model\_bin} f_{xmean}(k, l)$$

$$f_{xmean}(k, l) = \begin{cases} \text{if } (H^{Input}i_k = H^{Model}i_l \text{ and } H^{Input}q_k = H^{Model}q_l): abs(H^{Input}(i, q)_k \cdot xm - H^{Model}(i, q)_l \cdot xm) \\ \text{otherwise: } 0 \end{cases}$$

$$S_{ym} = \sum_{k=1}^{input\_bin} \sum_{l=1}^{model\_bin} f_{ymean}(k, l)$$

$$f_{ymean}(k, l) = \begin{cases} \text{if } (H^{Input}i_k = H^{Model}i_l \text{ and } H^{Input}q_k = H^{Model}q_l): abs(H^{Input}(i, q)_k \cdot ym - H^{Model}(i, q)_l \cdot ym) \\ \text{otherwise: } 0 \end{cases}$$

$$S_{xd} = \sum_{k=1}^{input\_bin} \sum_{l=1}^{model\_bin} f_{xdeviation}(k, l)$$

$$f_{xdeviationr}(k, l) = \begin{cases} \text{if } (H^{Input}i_k = H^{Model}i_l \text{ and } H^{Input}q_k = H^{Model}q_l): abs(H^{Input}(i, q)_k \cdot xd - H^{Model}(i, q)_l \cdot xd) \\ \text{otherwise: } 0 \end{cases}$$

$$S_{yd} = \sum_{k=1}^{input\_bin} \sum_{l=1}^{model\_bin} f_{ydeviation}(k, l)$$

$$f_{ydeviationr}(k, l) = \begin{cases} \text{if } (H^{Input}i_k = H^{Model}i_l \text{ and } H^{Input}q_k = H^{Model}q_l): abs(H^{Input}(i, q)_k \cdot xd - H^{Model}(i, q)_l \cdot yd) \\ \text{otherwise: } 0 \end{cases}$$

$$S_{count} = \sum_{k=1}^{input\_bin} \sum_{l=1}^{model\_bin} f_{count}(k, l)$$

$$f_{count}(k, l) = \begin{cases} \text{if } (H^{Input}i_k = H^{Model}i_l \text{ and } H^{Input}q_k = H^{Model}q_l): 1 \\ \text{otherwise: } 0 \end{cases}$$

$$S_{gray} = \sum_{k=1}^{256} f_{gray}(l)$$

$$f_{gray}(l) = abs(H^{Input}l \cdot graycount - H^{Model}l \cdot graycount)$$

Here, $H^{input}i_k$ is a value of kth feature vector having I color value in a color histogram inputted from meta information within image database, $H^{input}q_k$ is a value of kth feature vector having Q color value, $H^{input}(i,q)_k$.count is a value of accumulation count of kth feature of two-dimensional histogram having I and Q color value, $H^{input}(i,q)_k$.xm is a value of kth feature vector having a mean value of x-axis of two-dimensional histogram having I and Q color value, $H^{input}l_{,graycount}$ is a magnitude of a bin of Ith gray value of a model histogram. Also, ym is a feature vector having a mean value of y-axis, xd is a feature vector having a dispersion value of x-axis, yd is a feature vector having the dispersion value of y-axis, $H^{Model}i_k$ is the same as mentioned above except that the processing image is a model image and the first one. Finally, input_bin means a magnitude of the color histogram(the number of the whole bins) inputted from input meta database, model_bin means the size of the input image in the color histogram.

Here, the weighted value is determined in what feature is the most suitable for retrieval of image when mapping of similarity. Also, the respective feature values are processed by normalization so that the whole values have a value between 0.0 and 1.0.

As a result, when a value of similarity measurement is determined, retrieval is performed in the order of size within the entire meta database, so that the retrieved image is outputted to a user.

Although the present invention is illustrated and shown in connection with an image retrieval method using a color histogram, also in the case of a gray histogram, the image retrieval method using the mean value and the dispersion value, which are proposed in the present invention, can be applied.

The embodiments of the present invention set forth herein can be stored in a computer-readable storage medium, and processed by computer.

As described above, the disclosed embodiments of the present invention generate a better retrieval result by solving the problem of conventional retrieval methods that a separate algorithm of drawing spatial information must be used since those did not use spatial information.

Also, the present invention does not need additional processing time since position information and dispersion information can be generated at the same time when generating a histogram, and the present invention shows more efficient result by connecting color information, and position information and dispersion information.

Furthermore, the image histogram information proposed in the present invention can be used not only for image retrieval, but also as seed information in the image segmentation of the method for synthesizing regions.

Although representative embodiments of the present invention have been disclosed for illustrative purposes, those who are skilled in the art will appreciate that various modifications, additions and substitutions are possible without departing from the scope and spirit of the present invention as defined in the accompanying claims and the equivalents thereof.

What we claim:

1. A query image retriever of an image retrieval system using an image histogram comprising:

generation means for extracting a feature vector when a query image is inputted, and generating a value of a model to be retrieved;

operation means for computing the difference between the generated value of model and a dispersion value, a central point, count, and number of a corresponding histogram stored within the image database; and specifying means of similarity for specifying a similarity value of an image using the values computed by the operation means, wherein, the specifying means specifies the value of S determined through the following equation as a similarity value of an image:

$$S = W_1 S_{color} + W_2 S_{xm} + W_3 S_{ym} + W_4 S_{xd} + W_5 S_{yd} + W_6 S_{count} + W_7 S_{gray}$$

where $S_{color}$, $S_{xm}$, $S_{ym}$, $S_{xd}$, $S_{yd}$, $S_{count}$, and $S_{gray}$ are feature vectors of a color histogram determined by the following equation below, and $W_1$, $W_2$, $W_3$, $W_4$, $W_5$, $W_6$, and $W_7$ are predetermined weighted values:

$$S_{color} = \sum_{k=1}^{input\_bin} \sum_{l=1}^{model\_bin} f_{color}(k, l)$$

$$f_{color}(k, l) = \begin{cases} \text{if } (H^{Input}i_k == H^{Model}i_l \text{ and } H^{Input}q_k == H^{Model}q_l): \\ abs(H^{Input}(i, q)_k \cdot count - H^{Model}(i, q)_l \cdot count) \\ \text{otherwise: } 0 \end{cases}$$

$$S_{xm} = \sum_{k=1}^{input\_bin} \sum_{l=1}^{model\_bin} f_{xmean}(k, l)$$

$$f_{xmean}(k, l) = \begin{cases} \text{if } (H^{Input}i_k == H^{Model}i_l \text{ and } H^{Input}q_k == H^{Model}q_l): \\ abs(H^{Input}(i, q)_k \cdot xm - H^{Model}(i, q)_l \cdot xm) \\ \text{otherwise: } 0 \end{cases}$$

$$S_{ym} = \sum_{k=1}^{input\_bin} \sum_{l=1}^{model\_bin} f_{ymean}(k, l)$$

$$f_{ymean}(k, l) = \begin{cases} \text{if } (H^{Input}i_k == H^{Model}i_l \text{ and } H^{Input}q_k == H^{Model}q_l): \\ abs(H^{Input}(i, q)_k \cdot ym - H^{Model}(i, q)_l \cdot ym) \\ \text{otherwise: } 0 \end{cases}$$

-continued $$S_{xd} = \sum_{k=1}^{input\_bin} \sum_{l=1}^{model\_bin} f_{xdeviation}(k, l)$$

$$f_{xdeviationr}(k, l) = \begin{cases} \text{if } (H^{Input}i_k == H^{Model}i_l \text{ and } H^{Input}q_k == H^{Model}q_l): \\ abs(H^{Input}(i, q)_k \cdot xd - H^{Model}(i, q)_l \cdot xd) \\ \text{otherwise: } 0 \end{cases}$$

$$S_{yd} = \sum_{k=1}^{input\_bin} \sum_{l=1}^{model\_bin} f_{ydeviation}(k, l)$$

$$f_{ydeviationr}(k, l) = \begin{cases} \text{if } (H^{Input}i_k == H^{Model}i_l \text{ and } H^{Input}q_k == H^{Model}q_l): \\ abs(H^{Input}(i, q)_k \cdot xd - H^{Model}(i, q)_l \cdot yd) \\ \text{otherwise: } 0 \end{cases}$$

$$S_{count} = \sum_{k=1}^{input\_bin} \sum_{l=1}^{model\_bin} f_{count}(k, l)$$

$$f_{count}(k, l) = \begin{cases} \text{if } (H^{Input}i_k == H^{Model}i_l \text{ and } H^{Input}q_k == H^{Model}q_l): \\ 1 \\ \text{otherwise: } 0 \end{cases}$$

$$S_{gray} = \sum_{k=1}^{256} f_{gray}(l)$$

$$f_{gray}(l) = abs(H^{Input}l \cdot graycount - H^{Model}l \cdot graycount)$$

where $H^{input}i_k$ is a value of a kth feature vector having an I color value in a color histogram inputted from meta information within an image database, $H^{input}q_k$ is a value of a kth feature vector having a Q color value, $H^{input}(i,q)_k$.count is a value of an accumulation count of a kth feature of two-dimensional histogram having I and Q color value, $H^{input}(i,q)_k$.xm is a value of a kth feature vector having a mean value of an x-axis of a two-dimensional histogram having I and Q color values, $H^{input}l_{,graycount}$ is a magnitude of a bin of an lth gray value of a model histogram, ym is a feature vector having a mean value of y-axis, xd is a feature vector having a dispersion value of x-axis, yd is a feature vector having the dispersion value of y-axis, $H^{Model}i_k$ is the same as mentioned above except that the processing image is a model image and the first image, and input_bin means a magnitude of the color histogram (the number of the whole bins) inputted from the input meta database, and model_bin means the size of the input image in the color histogram.

2. An image retrieval method using an image histogram, comprising:

a first step of computing an image histogram bin when an image is inputted, and accumulating values of x, y, $x^2$, $y^2$ to compute central points and dispersion values;

a second step of normalizing the respective central points and dispersion values through dividing by the size of the whole image, and storing these;

a third step of generating a value of a model to be retrieved by drawing a feature vector when a query image is inputted, and computing the difference between the generated value of the model and central points and dispersion values of an image histogram, count, and number of corresponding bins within the data stored in the second step; and a fourth step of specifying a similarity value of an image using the values computed in the third step, wherein, the fourth step specifies the value of S determined by the following equation as the similarity value of the image:

$$S = W_1 S_{color} + W_2 S_{xm} + W_3 S_{ym} + W_4 S_{xd} + W_5 S_{yd} + W_6 S_{count} + W_7 S_{gray} \quad (5)$$

where $S_{color}$, $S_{xm}$, $S_{ym}$, $S_{xd}$, $S_{yd}$, $S_{count}$, and $S_{gray}$ are feature vectors of a color histogram determined by the following equation below, and $W_1$, $W_2$, $W_3$, $W_4$, $W_5$, $W_6$, and $W_7$ are predetermined weighted values:

$$S_{color} = \sum_{k=1}^{input\_bin} \sum_{l=1}^{model\_bin} f_{color}(k, l)$$

$$f_{color}(k, l) = \begin{cases} \text{if } (H^{Input}i_k == H^{Model}i_l \text{ and } H^{Input}q_k == H^{Model}q_l): \\ abs(H^{Input}(i, q)_k \cdot count - H^{Model}(i, q)_l \cdot count) \\ \text{otherwise: } 0 \end{cases}$$

$$S_{xm} = \sum_{k=1}^{input\_bin} \sum_{l=1}^{model\_bin} f_{xmean}(k, l)$$

$$f_{xmean}(k, l) = \begin{cases} \text{if } (H^{Input}i_k == H^{Model}i_l \text{ and } H^{Input}q_k == H^{Model}q_l): \\ abs(H^{Input}(i, q)_k \cdot xm - H^{Model}(i, q)_l \cdot xm) \\ \text{otherwise: } 0 \end{cases}$$

$$S_{ym} = \sum_{k=1}^{input\_bin} \sum_{l=1}^{model\_bin} f_{ymean}(k, l)$$

$$f_{ymean}(k, l) = \begin{cases} \text{if } (H^{Input}i_k == H^{Model}i_l \text{ and } H^{Input}q_k == H^{Model}q_l): \\ abs(H^{Input}(i, q)_k \cdot ym - H^{Model}(i, q)_l \cdot ym) \\ \text{otherwise: } 0 \end{cases}$$

$$S_{xd} = \sum_{k=1}^{input\_bin} \sum_{l=1}^{model\_bin} f_{xdeviation}(k, l)$$

$$f_{xdeviationr}(k, l) = \begin{cases} \text{if } (H^{Input}i_k == H^{Model}i_l \text{ and } H^{Input}q_k == H^{Model}q_l): \\ abs(H^{Input}(i, q)_k \cdot xd - H^{Model}(i, q)_l \cdot xd) \\ \text{otherwise: } 0 \end{cases}$$

$$S_{yd} = \sum_{k=1}^{input\_bin} \sum_{l=1}^{model\_bin} f_{ydeviation}(k, l)$$

$$f_{ydeviationr}(k, l) = \begin{cases} \text{if } (H^{Input}i_k == H^{Model}i_l \text{ and } H^{Input}q_k == H^{Model}q_l): \\ abs(H^{Input}(i, q)_k \cdot xd - H^{Model}(i, q)_l \cdot yd) \\ \text{otherwise: } 0 \end{cases}$$

$$S_{count} = \sum_{k=1}^{input\_bin} \sum_{l=1}^{model\_bin} f_{count}(k, l)$$

$$f_{count}(k, l) = \begin{cases} \text{if } (H^{Input}i_k == H^{Model}i_l \text{ and } H^{Input}q_k == H^{Model}q_l): \\ 1 \\ \text{otherwise: } 0 \end{cases}$$

$$S_{gray} = \sum_{k=1}^{256} f_{gray}(l)$$

$$f_{gray}(l) = abs(H^{Input}l \cdot graycount - H^{Model}l \cdot graycount)$$

where $H^{input}i_k$ is a value of a kth feature vector having an I color value in a color histogram inputted from meta information within image database, $H^{input}q_k$ is a value of a kth feature vector having a Q color value, $H^{input}(i,q)_k$.count is a value of an accumulation count of a kth feature of a two-dimensional histogram having an I and a Q color value, $H^{input}(i,q)_k$.xm is a value of a kth feature vector having a mean value of an x-axis of a two-dimensional histogram having I and Q color values, $H^{input}l_{.graycount}$ is a magnitude of a bin of an lth gray value of a model histogram, ym is a feature vector having a mean value of y-axis, xd is a feature vector having a dispersion value of x-axis, yd is a feature vector having the dispersion value of y-axis, $H^{Model}i_k$ is the same as mentioned above except that the processing image is a model image and the first image, and input$_{bin}$ means a magnitude of the color histogram (the number of the whole bins) inputted from the input meta database, and model_bin means the size of the input image in the color histogram.

3. The image retrieval method according to claim 2, wherein the first step further comprises:

a first sub-step for converting the image into a color coordinate system when a color image is inputted, and normalizing this to reduce the feature of the converted value; and a second sub-step fpr computing a color histogram bin from the normalized value in the first sub-step.

4. The image retrieval method according to claim 3, wherein the first sub-step reduces the number of the feature by converting the converted value into a two-dimensional histogram except the same brightness.

5. The image retrieval method according to claim 4, wherein the first sub-step reduces the number of the feature of the converted value using a scaling factor.

6. The image retrieval method according to claim 2, wherein the first step determines the central points and the dispersion values through the following equation:

$$(m_x, m_y), \quad m_x = \frac{1}{n}\sum_{i=1}^{n} x_i$$

$$m_y = \frac{1}{n}\sum_{i=1}^{n} y_i$$

$$(\delta_x^2, \delta_y^2), \quad \delta_x^2 = \frac{1}{n}\sum_{i=1}^{n} x_i^2 - m_x^2$$

$$\delta_y^2 = \frac{1}{n}\sum_{i=1}^{n} y_i^2 - m_y^2$$

where $m_x$ is a mean value about x-axis, $m_y$ is a mean value about y-axis, $\delta_x^2$ is a dispersion value about x-axis, and $\delta_y^2$ is a dispersion value about y-axis.

* * * * *